(12) United States Patent  
Sakamoto

(10) Patent No.: US 7,126,328 B2
(45) Date of Patent: Oct. 24, 2006

(54) ROLLING BEARING UNIT WITH ROTATIONAL SPEED DETECTING DEVICE

(75) Inventor: Junshi Sakamoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/338,445

(22) Filed: Jan. 24, 2006

(65) Prior Publication Data

US 2006/0145686 A1 Jul. 6, 2006

Related U.S. Application Data

(63) Continuation-in-part of application No. PCT/JP04/10309, filed on Jul. 20, 2004.

(30) Foreign Application Priority Data

Jul. 24, 2003 (JP) .............................. 2003-279365

(51) Int. Cl.
G01B 7/30 (2006.01)
F16C 19/00 (2006.01)

(52) U.S. Cl. .................. 324/207.25; 384/448
(58) Field of Classification Search ........... 324/207.25; 384/448

See application file for complete search history.

(56) References Cited

U.S. PATENT DOCUMENTS

| 5,762,425 | A |  | 6/1998 | Ouchi |
|---|---|---|---|---|
| 6,127,819 | A | * | 10/2000 | Ouchi ......................... 324/173 |
| 6,267,509 | B1 |  | 7/2001 | Morimura |
| 6,499,885 | B1 |  | 12/2002 | Toda et al. |
| 6,559,633 | B1 |  | 5/2003 | Nachtigal et al. |
| 6,644,858 | B1 | * | 11/2003 | Torii et al. .................. 384/448 |
| 2002/0018606 | A1 |  | 2/2002 | Toda et al. |

FOREIGN PATENT DOCUMENTS

| JP | 3-279061 | 12/1991 |
|---|---|---|
| JP | 9-21822 | 1/1997 |
| JP | 9-196945 | 7/1997 |

(Continued)

OTHER PUBLICATIONS

International Search Report dated Nov. 9, 2004.

Primary Examiner—Bot LeDynh
(74) Attorney, Agent, or Firm—Katten Muchin Rosenman LLP

(57) ABSTRACT

An inner diameter-side cylindrical member 37 of a supporting ring 36 is externally fitted on a shoulder 35 of an inner ring 3 constituting a hub. An encoder 29a is supported on the outer peripheral surface of an outer diameter-side cylindrical portion 38 constituting the supporting ring 36. Further, to a metal core 30a internally fitted to an outer ring 1 is supported and fixed a rotation-detecting sensor 21b, and also a proximal end portion of a seal member 44 is connected and fixed thereto. An edge of at least one of seal lips 45a, 45b, 45c of the seal member 44 is brought to be in sliding contact with the supporting ring 36 around the entire circumference. Since the rotation-detecting sensor 21b and the seal member 44 are supported by the core metal 30a, a rolling bearing unit can be downsized. Further, since the encoder 29a is placed on the outer peripheral surface of the outer diameter-side cylindrical portion 38, the width dimension of a surface with which the edge of each of the seal lips 45a, 45b, 45c is brought to be in sliding contact is secured for excellent sealing ability. The structure provides a rolling bearing unit with a rotating speed-detecting device, where the bearing unit is downsized and has a construction capable of achieving excellent sealing ability.

5 Claims, 8 Drawing Sheets

FOREIGN PATENT DOCUMENTS

| | | |
|---|---|---|
| JP | 10-48229 | 2/1998 |
| JP | 2000-19190 | 1/2000 |
| JP | 2000-221202 | 8/2000 |
| JP | 2002-54647 | 2/2002 |

\* cited by examiner

ROLLING BEARING UNIT WITH ROTATIONAL SPEED DETECTING DEVICE

CROSS REFERENCE TO RELATED APPLICATION

This application is a continuation-in-part of PCT application number PCT/JP2004/010309 filed on Jul. 20, 2004, now International Publication WO 2005/010382 and claims priority from Japanese Patent Application 2003-279365 filed on Jul. 24, 2003, the contents of which are herein incorporated by reference.

TECHNICAL FIELD

The present invention relates to improvements to a rolling bearing unit with a rotational speed detecting device, which is used for rotatably supporting the wheel of an automobile with respect to a suspension system, and for detecting the rotational speed of the wheel.

BACKGROUND ART

A rolling bearing unit is used to rotatably support the wheel of an automobile with respect to a suspension system. Moreover, in order to control an anti-lock brake system (ABS) or a traction control system (TCS), it is necessary to detect the rotational speed of the wheel. Therefore, a method has been widely used recently where the wheel is rotatably supported with respect to the suspension system, and the rotational speed of the wheel is detected, by using a rolling bearing unit with a rotational speed detecting device in which a rotational speed detecting device is incorporated into the rolling bearing unit.

As one example of a rolling bearing unit with a rotational speed detecting device used for such a purpose, a structure as shown in FIGS. 5 and 6 is disclosed in Patent Reference 1 (Japanese Patent Application Publication No. H09-21822). This conventionally-known rolling bearing unit with a rotational speed detecting device rotatably supports a hub 4 comprising a hub body 2 and an inner ring 3 such that it can rotate freely on the inner diameter side of an outer ring 1 which is supported and fixed to a suspension system (not shown in the figure), and which does not rotate during use. The outer ring 1 has an external flange shaped attachment portion 5 on its outer peripheral surface, and double-row outer ring raceways 6 on its inner peripheral surface. The hub body 2 has a flange 7 for supporting the wheels on the outside (relative to the axial direction, the outer side in the vehicle widthwise direction when assembled on an automobile. Similarly in the present specification. The left side in the figures excluding FIG. 6) end portion of the outer peripheral surface. Furthermore, a first inner ring raceway 8 is formed on a middle portion of the outer peripheral surface of the hub body 2, and the inner ring 3 formed with a second inner ring raceway 10 on its outer peripheral surface, is fitted onto a small diameter step portion 9 formed on the inside (relative to the axial direction, on the vehicle widthwise central side when assembled on an automobile. Similarly in the present specification. The right side of the figures excluding FIG. 6) end portion.

Moreover, between the outer ring raceways 6 and the inner ring raceways 8 and 10, a plurality of rolling elements 11 are rotatably provided, and the hub 4 is supported on the inner diameter side of the outer ring 1 such that it rotates freely. Furthermore, a first seal ring 12 is provided between the outside opening of the outer ring 1 and the outer peripheral surface of the middle portion of the hub body 2. This first seal ring 12 closes the outside opening of a cylindrical space 13 in which the rolling elements 11 are provided, in order to prevent grease in the space 13 from leaking outside, or external foreign substances from entering the space 13. Here, in the example of the figure, balls are used as the rolling elements 11. However, in the case of a rolling bearing unit with a rotational speed detecting device for an automobile, whose weight is higher, tapered rollers may be used as the rolling elements. Furthermore, a drive shaft 15 is provided in a central hole 14 of the hub body 2 such that it can be inserted freely, and the outer peripheral surface of the drive shaft 15 and the inner peripheral surface of the central hole 14 are engaged freely using a spline. When the automobile is traveling, the hub body 2 is rotated by the drive shaft 15 via a constant velocity joint 16 provided on its inside end.

On the other hand, a combination seal ring 17 is provided between the outer peripheral surface of a portion at the inside end of the inner ring 3, which is inwardly away from the second inner ring raceway 10, and the inner peripheral surface of the inside end of the outer ring 1, so that the inside opening of the space 13 is closed. Half of the outer diameter side of a metal core 19 of an inner diameter side seal ring element 18, which constitutes the combination seal ring 17, is formed in a comb shape, and the magnetic characteristics on the inner surface of the half of the outer diameter side are changed alternately around the direction of the circumference at equal spacing, thus providing a function as an encoder in that half of the outer diameter side of the metal core 19.

On the other hand, a cover 20, whose cross-section is approximately L-shaped, and which is formed in a circular shape overall by forming from a metal plate using a press, is externally secured on the outer peripheral surface of the inside end of the outer ring 1. A rotation-detecting sensor 21 is supported in the inside of the cover 20. The rotation-detecting sensor 21 is encapsulated using a synthetic resin 22, and its detecting section faces the inside surface of the half of the outer diameter side of the metal core 19 that functions as the encoder. The rotation-detecting sensor 21 is formed by a permanent magnet 23, which is polarized in the axial direction (horizontal direction of FIG. 5), and a magnetic detecting element 24 such as a Hall IC, a magnetoresistive element or the like. A signal from the rotation-detecting sensor 21 is transmitted via a harness 25 to a controller (not shown in the figure), which is provided on the vehicle body side, in order to control the ABS and TCS.

A seal ring 26 is fitted around the whole circumference of the inner peripheral surface of the inside end of the cover 20. The arrangement is such that the edge of the seal ring 26 makes a sliding contact all around the circumference of the surface of the constant velocity joint 16 when the drive shaft 15 is inserted into the central hole 14 of the hub body 2.

According to the rolling bearing unit with a rotational speed detecting device disclosed in Patent Reference 1, which is constructed as described above, a wheel fixed onto the hub body 2 can be rotatably supported on the suspension system supporting the outer ring 1. Furthermore, when the metal core 19 which functions as an encoder rotates together with the inner ring 3 fixed on the inside end of the hub body 2, accompanying rotation of the wheel, the density of the magnetic flux transmitted to the magnetic detecting element 24 of the rotation-detecting sensor 21 changes. Hence the resistance value or the output voltage of the rotation-detecting sensor 21 change. In this manner, the frequency at which the value of the resistance or the output voltage of the rotation-detecting sensor 21 changes is proportional to the rotational speed of the wheel. Therefore, if an output signal from the rotation-detecting sensor 21 is input to the controller (not shown in the figure), it is possible to obtain the rotational speed of the wheel, and control the ABS and TCS appropriately.

Moreover, in the case of the conventional structure shown in FIGS. 5 and 6, the seal ring 26 is fitted to the inside end of the inner peripheral surface of the cover 20, and the edge of the seal ring 26 makes a sliding contact all around the circumference of the surface of the constant velocity joint 16. Therefore when the rolling bearing unit with a rotational speed detecting device is used, it is possible to prevent foreign substances such as magnetic powder and the like from entering the cover 20. Accordingly, it is possible to prevent foreign substances such as magnetic powder and the like from sticking near the permanent magnet 23 of the rotation-detecting sensor 21, and to prevent the accuracy of the detected rotational speed of the wheel from deteriorating.

In the case of the conventional structure as shown in FIGS. 5 and 6, the metal core 19, which is a structural element of the combination seal ring 17 for closing the inside opening of the space 13 in which the rolling elements 11 are provided, has a function as an encoder. However, the rotation-detecting sensor 21 is supported in the cover 20, which is independent from the combination seal ring 17. Therefore, not only is it difficult to miniaturize the rotational speed detecting device section, but also the assembly operation of the rotational speed detecting device section is troublesome. To address this, Patent Reference 2 (Japanese Patent Application Publication No. H3-279061), Patent Reference 3 (U.S. Pat. No. 6,559,633), and Patent Reference 4 (U.S. Pat. No. 6,499,885), disclose a structure of a rolling bearing unit with a rotational speed detecting device, in which not only an encoder but also a rotation-detecting sensor are installed in a combination sealing section.

FIG. 7 shows a rolling bearing unit with a rotational speed detecting device as disclosed in Patent Reference 4. In the case of this second example of a conventional structure, a circular case 27 made of synthetic resin is fitted into the inside end of an outer ring 1, and a combination seal ring 17 is provided between the inner peripheral surface of the case 27 and the outer peripheral surface of the inside end of the inner ring 3. Of the inner diameter side and the outer diameter side seal ring elements 18 and 28, which constitute the combination seal ring 17, the inner diameter side seal ring element 18 is externally fixed on the inside end of the inner ring 3. On the other hand, the outer diameter side seal ring element 28 is connected and fixed on an inner peripheral surface portion of the case 27 at the same time as injection molding the case 27. Furthermore, an annular encoder 29 is fixed to the inner diameter side seal ring element 18, and a rotation-detecting sensor 21a including a magnetic detecting element 24a is fixed to the outer diameter side seal ring element 28.

According to the structures disclosed in Patent References 2 to 4, including the second example of an existing structure shown in FIG. 7, it is possible to miniaturize the rotational speed detecting device section, and to simplify the assembly operation of the rotational speed detecting device section. However, the structure disclosed in Patent Reference 2 requires extremely small sensors and encoders when it is actually used for a rolling bearing unit for an automobile. Accordingly, it is not capable of practical use with current technical standards.

On the other hand, in the case of the invention disclosed in Patent References 3 and 4, the sensor and encoder disclosed have realistic dimensions. However, in the structure disclosed in Patent Reference 3 an encoder is supported on the inside surface of an annular portion of a slinger externally fixed to the inside end of a hub, and the edge of the seal member makes a sliding contact with the outer peripheral surface of the cylinder section of the slinger, and a part of the inside surface of the annular portion, which is toward the outer diameter. In the case of such a structure disclosed in Patent Reference 3, the design is not realistic as a combination seal ring. For instance the width of the part with which the edge of the seal member makes a sliding contact is small, and so forth. As a result, in the case where the outer ring and the hub are displaced due to the load applied to the rolling bearing unit during use, the edge of the seal member comes away from the mating surface, so there is a possibility that the necessary sealing performance cannot be ensured.

Moreover, in the case of the structure disclosed in Patent Reference 4, in addition to a metal core 30 constituting the outer diameter seal ring element 28 there is a seal member 31 constituting the inner diameter side seal ring element 18, between the surface to be detected of the encoder 29, and the detecting section of the magnetic detecting element 24a. As a result, it is not possible to make the distance between the surface to be detected and the detecting section small. In order to increase the reliability of the rotational speed detection, it is preferable to make this distance small. Therefore, a structure in which the distance cannot be made small is not desirable.

Furthermore, in the case of the structure disclosed in Patent Reference 4, since the outer diameter side seal ring element 28, which supports the rotation-detecting sensor 21a, is internally fixed to the outer ring 1 via the case 27 made of synthetic resin, it is difficult to ensure the strength of the support of the rotation-detecting sensor 21a. That is, the coefficient of friction that acts on the contact portion between the outer peripheral surface of the case 27 made of synthetic resin, and the inner peripheral surface of the outer ring 1 made of metal, is small. Hence the case 27 can easily rotate relative to the outer ring 1 with comparatively little force. Moreover, due to the difference in the coefficient of expansion between synthetic resin and metal, there is a possibility that the surface pressure of the contact portion is reduced. The reduction in the surface pressure of the contact portion occurs directly at low temperature, and also due to permanent deformation in fatigue of the synthetic resin, which accompanies an excessive increase in surface pressure at high temperature. For whichever reason, when the surface pressure of the contact portion is reduced, coupled with the fact that the coefficient of friction of the contact portion is low, the case 27 rotates relative to the outer ring 1. When it rotates, it causes a failure such as disconnection of the harness 25 for obtaining a signal from the rotation-detecting sensor 21a.

[Patent Reference 1] Japanese Patent Application Publication No. H9-21822

[Patent Reference 2] Japanese Patent Application Publication No. H3-279061

[Patent Reference 3] U.S. Pat. No. 6,559,633

[Patent Reference 4] U.S. Pat. No. 6,499,885

DISCLOSURE OF THE INVENTION

[Problems to be Solved by the Invention]

The present invention takes the above-described situations into consideration, with an object of realizing a practical rolling bearing unit with a rotational speed detecting device, in which the rotational speed detecting device section can be miniaturized, the assembly operation of the rotational speed detecting device section can be facilitated, and furthermore, in which sufficient sealing performance, reliability and durability can be obtained.

[Means of Solving the Problems]

In a rolling bearing unit with a rotational speed detecting device of the present invention, a rolling bearing unit with a rotational speed detecting device according to a first aspect comprises; an outer ring, a hub body, an inner ring, a plurality of rolling elements, a supporting ring, an encoder, a metal core, a rotation-detecting sensor, and a seal member.

Here, the outer ring has double-row outer ring raceways on its inner peripheral surface, and does not rotate during use.

The hub body has a flange for supporting a wheel on a portion towards an outside end of its outer peripheral surface. Moreover, a first inner ring raceway, which faces the outer ring raceway on the outside of the double-row outer ring raceways, is provided on a middle portion either directly or via another member.

The inner ring has a second inner ring raceway, which faces the outer ring raceway on the inside of the double-row outer ring raceways, on an outer peripheral surface, and is externally secured to an inside end of the hub body.

A plurality of the rolling elements is respectively provided so as to be freely rotatable between the outer ring raceways, and each of the first and second inner ring raceways.

Moreover, the supporting ring comprises an inner diameter-side cylindrical portion and an outer diameter-side cylindrical portion, which are concentric with each other, connected by a connecting portion, and is fixed to the inner ring by externally securing the inner diameter-side cylindrical portion to a portion at an outer peripheral surface of the inner ring which is away from the second inner ring raceway toward the inside.

The encoder is supported all around the circumference of an outer peripheral surface of the outer diameter-side cylindrical portion constituting the supporting ring, and the characteristics of an outer peripheral surface, which is a part to be detected, are changed alternately relative to the circumference direction.

The metal core is supported and fixed to an inside end of the outer ring.

In the rotation-detecting sensor, the detecting portion thereof faces the outer peripheral surface of the encoder in the radial direction, in a state where it is supported by a part of the metal core.

Furthermore, the seal member is supported at a proximal end portion thereof by the metal core, and a tip edge is made in a sliding contact all around the circumference of a part of the supporting ring or a part of the inner ring.

On the other hand, a rolling bearing unit with a rotational speed detecting device according to a second aspect of the present invention is provided with an outer ring, a hub body, an inner ring, a plurality of rolling elements, a combination seal ring, an encoder, and a rotation-detecting sensor.

The outer ring has double-row outer ring raceways on its inner peripheral surface, and does not rotate during use.

The hub body has a flange for supporting a wheel on a portion towards an outside end of its outer peripheral surface. Moreover, a first inner ring raceway, which faces the outer ring raceway on the outside of the double-row outer ring raceways, is provided on a middle portion either directly or via another member.

The inner ring has a second inner ring raceway, which faces the outer ring raceway on the inside of the double-row outer ring raceways, on an outer peripheral surface, and is externally secured to an inside end of the hub body.

A plurality of the rolling elements is respectively provided so as to be freely rotatable between the outer ring raceways, and each of the first and second inner ring raceways.

Moreover, the combination seal ring is provided between a portion of the outer peripheral surface of the inside end of the inner ring, toward the inside, away from the second inner ring raceway, and the inner peripheral surface of the inside end of the outer ring. It covers a ring shaped gap between the two surfaces, and comprises a pair of combined seal ring elements.

The encoder is provided on a part of an inner diameter side seal ring element, being one of the two seal ring elements, fixed at the inside end of the inner ring, so that it is concentric to this inner ring, and the characteristics of the part to be detected are changed alternately relative to the circumference direction.

Furthermore, the rotation-detecting sensor is provided on a part of a metal core constituting the outer diameter side seal ring element, among the two seal ring elements, fixed at the inside end of the outer ring, and its detecting section faces the part to be detected of the encoder.

The rotation-detecting sensor comprises an IC package which is located on a portion further toward a space in which the rolling elements are installed than the outer diameter side seal ring element, for transmitting a signal corresponding to a change in the characteristics of the part to be detected of the encoder, and a capacitor which is located on a portion farther from the space in which the rolling elements are installed than the outer diameter side seal ring element, for processing a signal transmitted from the IC package.

[Effects of the Invention]

In the case of a rolling bearing unit with a rotational speed detecting device of the present invention constructed as described above, since the rotation-detecting sensor is supported on the metal core, it is possible to achieve miniaturization. Furthermore, it is possible to permit some tolerance in the part of the member with which the edges of the seal member make sliding contact, thus enabling sufficient sealing performance to be ensured.

BEST MODE FOR CARRYING OUT THE INVENTION

In order to implement the present invention, it is preferable to use an encoder made of a permanent magnet, in which the direction of polarization is changed alternately around the direction of the circumference at equal spacing, so that south poles and north poles of the surface to be detected are positioned alternately and at equal spacing. Furthermore, for a rotation-detecting sensor, an active type magnetic sensor is used in which a magnetic detecting element is installed whose characteristics change according to the direction of the magnetic flux. Using a construction as described above, it is possible to use a small sized magnetic sensor as a rotation-detecting sensor to be mounted on a metal core, and to ensure the reliability of detection of rotational speed sufficiently.

[First Embodiment]

Figure 1:
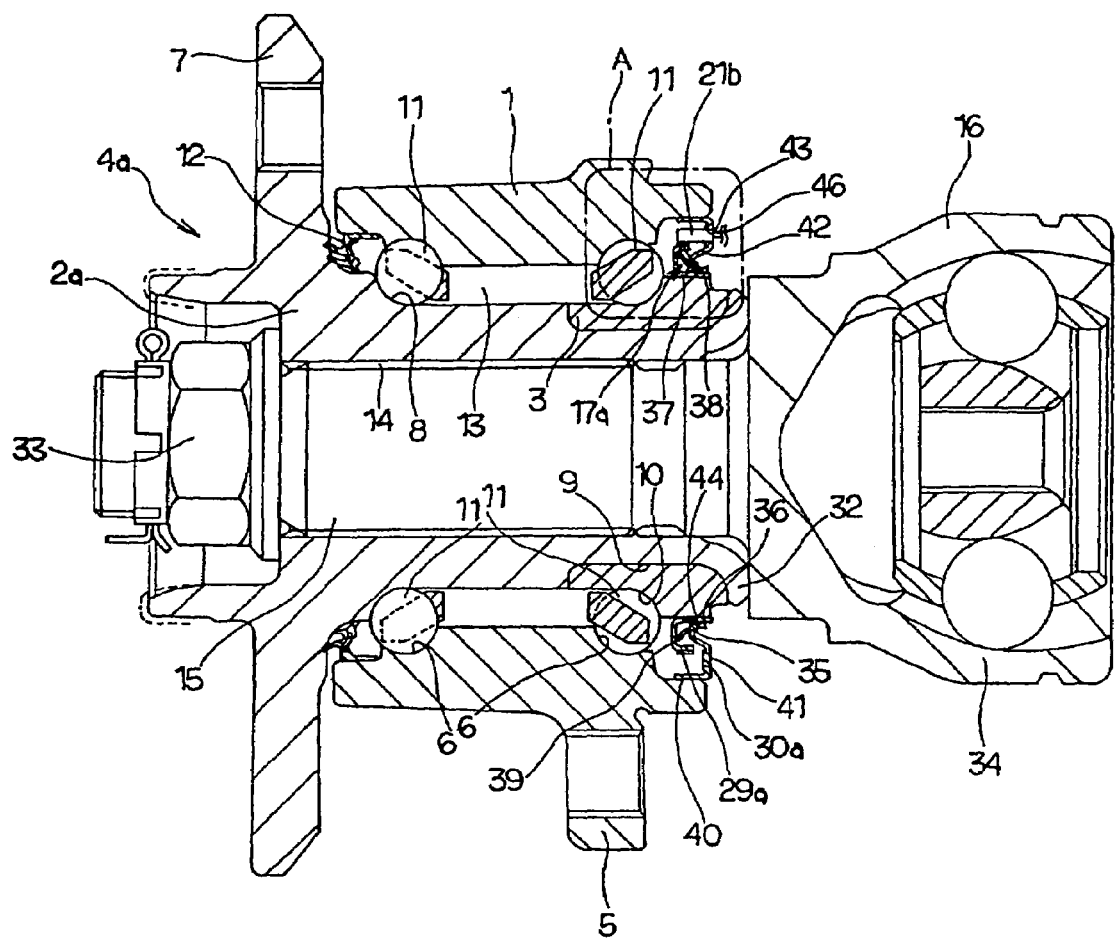
FIG. 1 is a cross-sectional diagram showing a first embodiment of the present invention.
Figure 2:
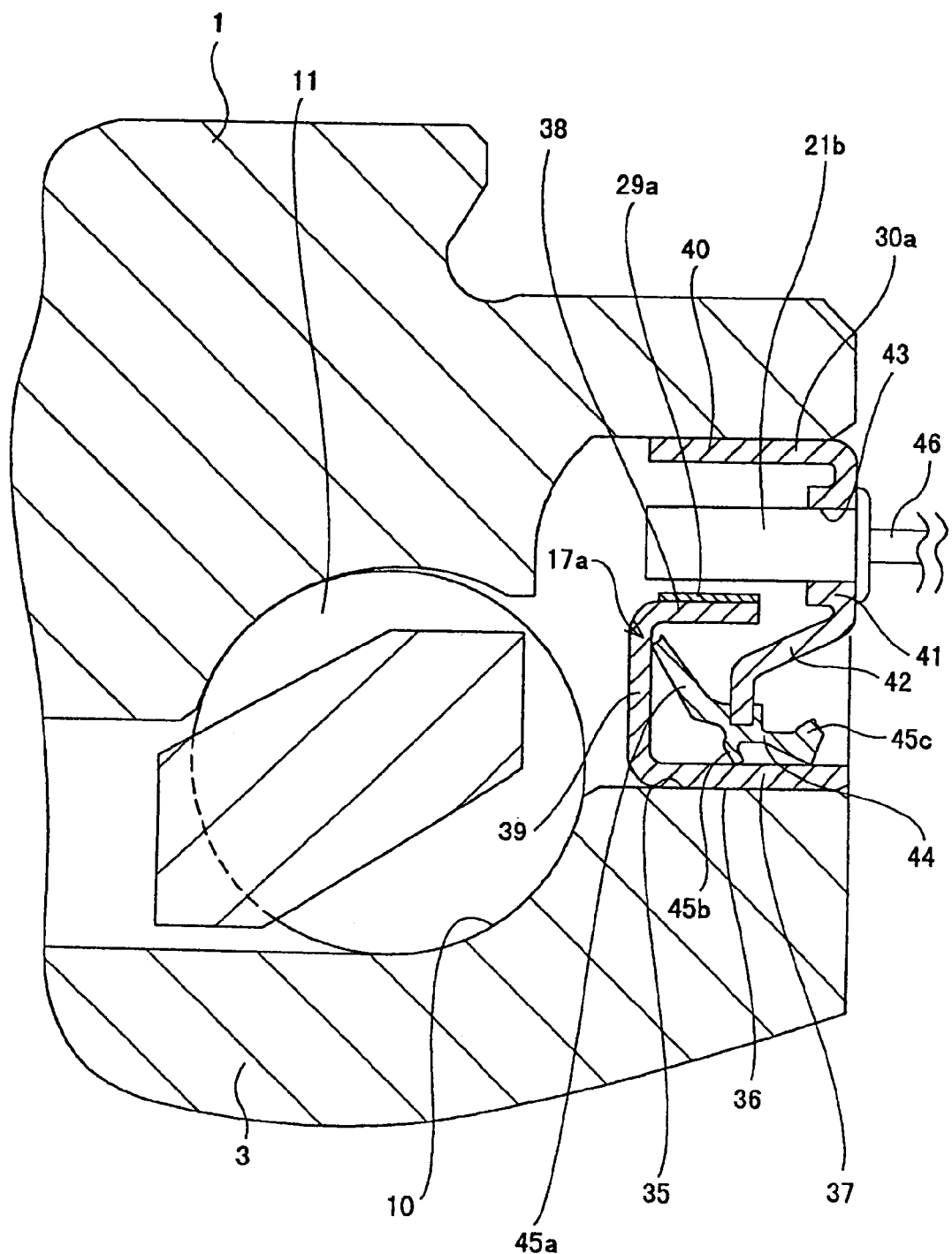
FIG. 2 is an enlarged diagram of part A of FIG. 1.
Figure 5:
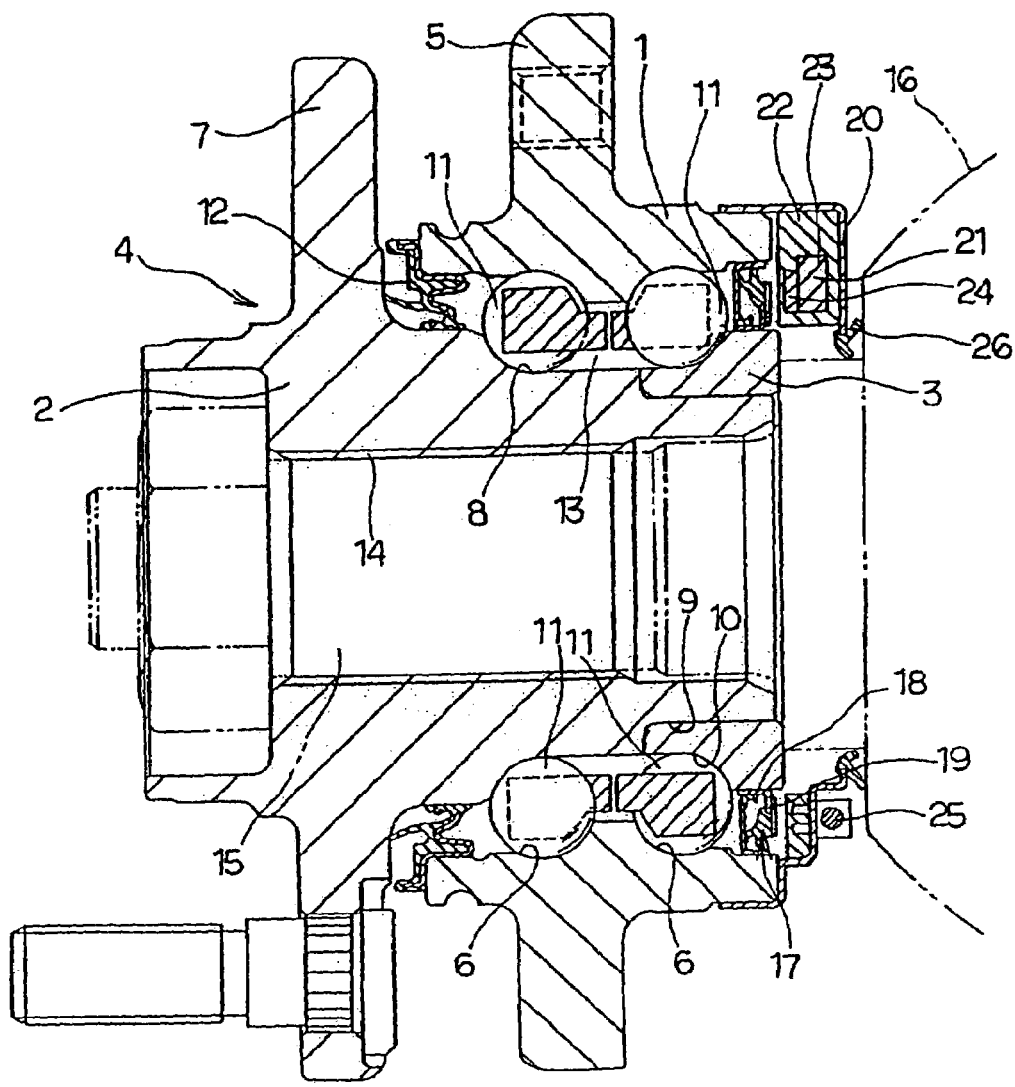
FIG. 5 is a cross-sectional diagram through B-O-B of FIG. 6, which shows a first example of a conventional structure.
Figure 6:
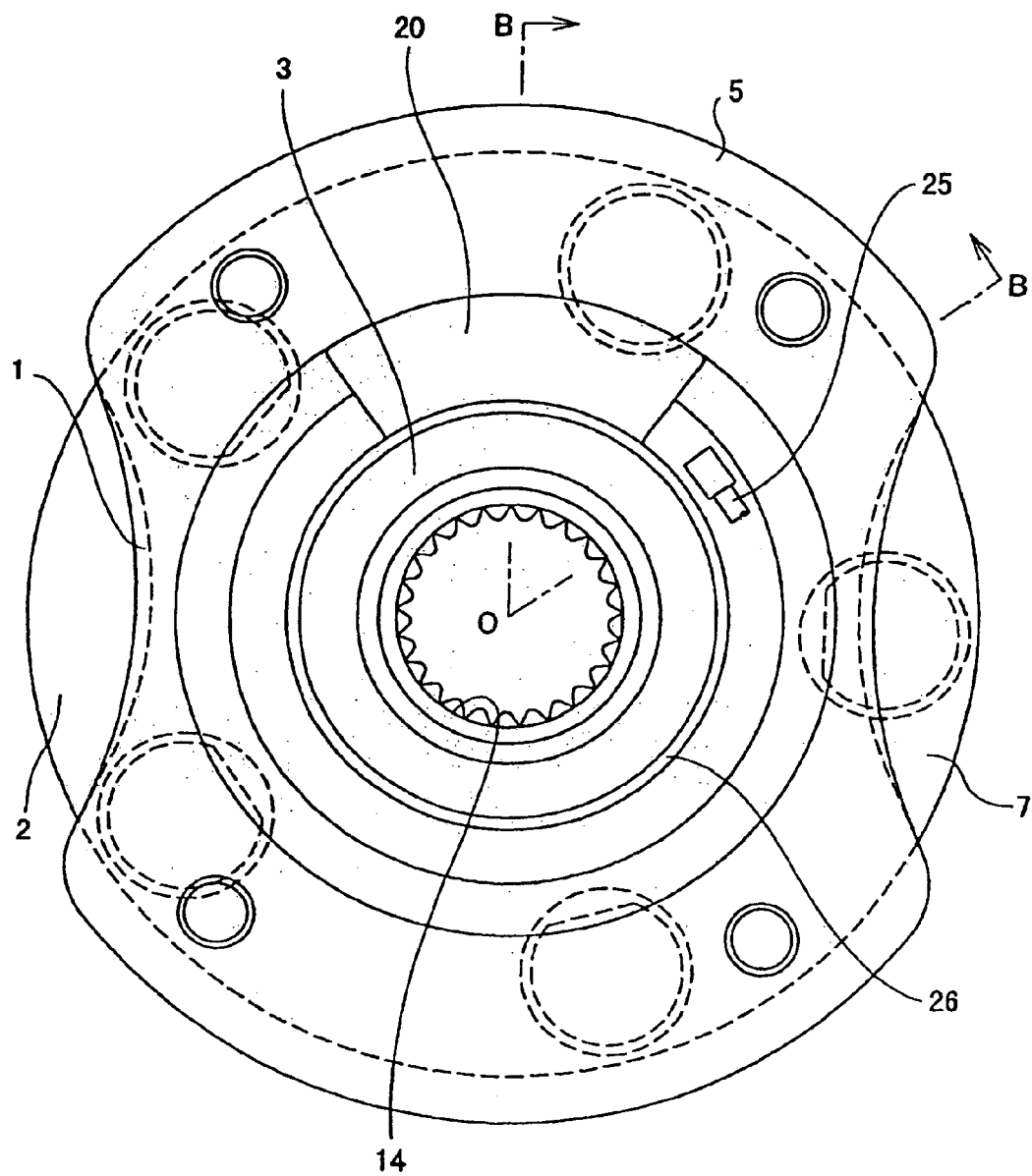
FIG. 6 is a diagram showing FIG. 5 viewed from the right.
Figure 7:
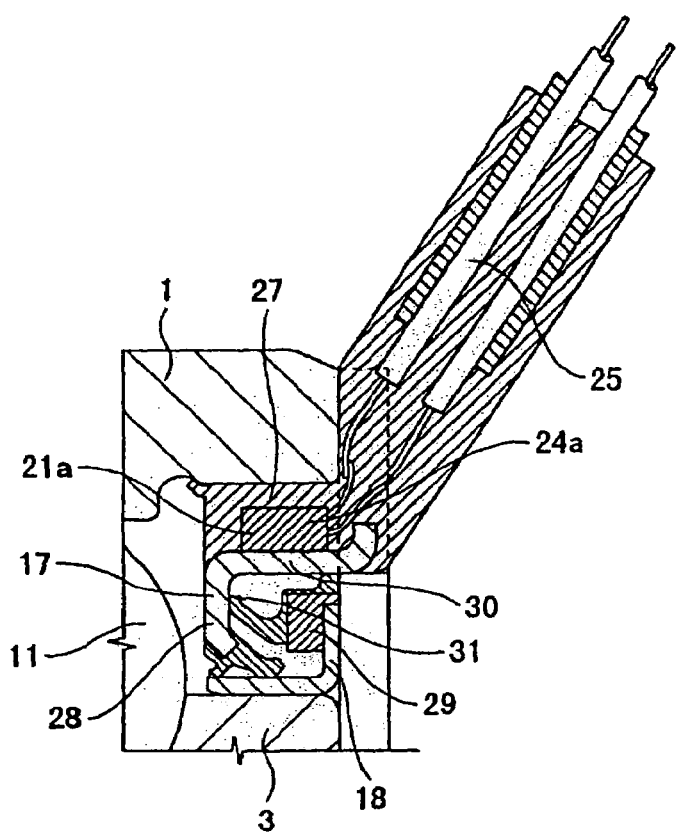
FIG. 7 is a cross-sectional diagram of a main part, showing a second example of a conventional structure.

FIGS. 1 and 2 show a first embodiment according to a first aspect of the present invention. Here, the characteristic of the present invention is that various schemes are devised for the arrangement of an encoder 29a and a rotation-detecting sensor 21b for detecting the rotational speed of a hub 4a, so that miniaturization, maintenance of sealing performance, and maintenance of reliability are all achieved. Since the construction and operation of the other parts are similar to those in the conventional structure as shown in FIGS. 5 and 6, the descriptions associated with similar parts are omitted, or simplified. Hereunder is a description concentrating on the characteristic parts of the present invention and the parts that are different from the conventional structure.

In the case of the present example, by means of a crimped portion 32 formed by plastic deformation of the inside end of a hub body 2a outwards in the radial direction, pressure is applied to the inside end surface of an inner ring 3 externally fitted to a small diameter step portion 9 of the hub body 2a, and thus the inner ring 3 is fixed to the hub body 2a. In a state where a central hole 14 of the hub body 2a, and a drive shaft 15 attached to a constant velocity joint 16 are engaged using a spline, and a nut 33 is screwed tightly onto the tip end of the drive shaft 15, the outside end surface of a housing section 34 of the constant velocity joint 16 is abutted against the crimped portion 32.

In the case of the present example, a supporting ring 36 is externally fixed to a shoulder 35, which is a portion at the middle of the outer peripheral surface of the inner ring 3, toward the inside, away from a second inner ring raceway 10 formed on the outer peripheral surface of the inner ring 3. The supporting ring 36 is formed with an approximately C-shaped cross section in an overall annular shape, by bending a magnetic metal plate such as a steel plate of SUS430 or SPCC using a press. It comprises an inner diameter-side cylindrical portion 37 and an outer diameter-side cylindrical portion 38, which are concentric with each other, connected by a connecting portion 39. The supporting ring 36 as described above is externally fixed by interference fit of the inner diameter-side cylindrical portion 37 on the shoulder 35 in a state where the edges of the cylindrical portions 37 and 38 face inside, in other words, in a state where the connecting portion 39 is positioned facing outside. In this state, the outer diameter-side cylindrical portion 38 encircles the shoulder 35.

In this manner, the encoder 29a is supported all around the circumference of the outer peripheral surface of the outer diameter-side cylindrical portion 38 provided encircling the inside end of the inner ring 3. The encoder 29a is a so-called rubber magnet, or plastic magnet, in which ferromagnetic powder such as ferrite or the like is mixed in a rubber or synthetic resin, and is polarized in the radial direction. The direction of polarization changes alternately and at equal spacing around the circumference direction. Accordingly, the south poles and the north poles are placed alternately and at equal spacing on the outer peripheral surface, which is the part to be detected, of the encoder 29a.

Furthermore, a metal core 30a is internally fixed to the inner peripheral surface of the inside end of the outer ring 1. The metal core 30a is formed with an approximately J-shaped cross section in an overall annular shape, by bending using a press, a corrosion resistant metal plate, such as a galvanized steel plate or a stainless steel plate of SUS304. It has a supporting cylindrical portion 40 and an annular support portion 41, which is bent inward in the radial direction from the inside edge of the supporting cylindrical portion 40. A sloping portion 42 is provided in the radially middle portion of the annular support portion 41, and compared to the outer diameter side of the annular support portion 41, the inner diameter side is located on the more outside (left-hand side of FIGS. 1 and 2) of the supporting cylindrical portion 40. The metal core 30a as described above is internally fixed by interference fit of the supporting cylindrical portion 40 on the inner peripheral surface of the inside end on the outer ring 1, in a state where the edge of the supporting cylindrical portion 40 faces outside, in other words, in a state where the annular support portion 41 is positioned inside. In this state, the annular support portion 41 is located on the inner diameter side of the inside end of the outer ring 1.

The rotation-detecting sensor 21b is supported by a part of the metal core 30a. The rotation-detecting sensor 21b is an active type magnetic sensor having a magnetic detecting element such as a Hall IC, a magnetic resistive element, or the like. In the case of the present example, since the encoder 29a is made of a permanent magnet, there is no permanent magnet provided on the rotation-detecting sensor 21b side. In order to support the rotation-detecting sensor 21b, in the case of the present example, a support hole 43 is formed by a burring process in the outer diameter side half of the annular support portion 41 constituting the metal core 30a, and the rotation-detecting sensor 21b is inserted and fixed into the support hole 43. In this manner, in a state where the rotation-detecting sensor 21b is supported and fixed to part of the metal core 30a, the detecting section formed on the side of the tip portion (bottom of the left-hand portion in FIGS. 1 and 2), is close to and faces the outer peripheral surface of the encoder 29a via a gap of approximately 0.5 mm to 2 mm in a state where there is no external load on the rolling bearing unit. Here, a packing is provided between the annular support portion 41 and the rotation-detecting sensor 21b, so that foreign substances such as muddy water and the like can be prevented from entering the space in which the rolling elements 11 are installed from the gap between the rotation-detecting sensor 21b and the support hole 43.

Furthermore, the proximal end portion of a seal member 44 made of an elastic material such as an elastomer of rubber, is fastened to the internal peripheral edge of the annular support portion 41 of the metal core 30a. In the present example, the seal member 44 has three seal lips 45a, 45b and 45c. Among the seal lips 45a, 45b and 45c, the seal lip 45a of the inner end makes a sliding contact all around the inside surface of the connecting portion 39, or the inner peripheral surface of the outer diameter-side cylindrical portion 38, which constitute the supporting ring 36, and the other two seal lips 45b and 45c, in the same way, make sliding contact with the outer peripheral surface of the inner diameter-side cylindrical portion 37. Accordingly, in the case of the present example, a combination seal ring 17a is formed by the supporting ring 36, the metal core 30a, and the seal member 44. Moreover, it is also possible to shorten the axial dimension of the inner diameter-side cylindrical portion 37 of the supporting ring 36 so that the edge of some of the seal lips 45a, 45b and 45c makes a sliding contact with the outer peripheral surface of the shoulder 35 of the inner ring 3 directly. Furthermore, it is also possible to fit a garter spring on the outer peripheral surface of the seal lip 45c, which is the innermost, so that the sealing performance of the seal lip 45c can be ensured.

In the case of a rolling bearing unit with a rotational speed detecting device of the present example, which is constructed as described above, when the hub 4a rotates, the north poles and south poles on the surface to be detected of the encoder 29a pass alternately in the vicinity of the detecting section of the rotation-detecting sensor 21b. As a result, the direction of magnetic flux flowing inside the magnetic detecting element, which forms the rotation-detecting sensor 21b, changes alternately, and the characteristics of the magnetic detecting element change alternately. In this manner, since the frequency at which the characteristics of the magnetic detecting element change is proportional to the rotational speed of the hub 4a, if the detected signal from the rotation-detecting sensor 21b is transmitted to a controller (not shown in the figure) through the harness 46, it is possible to control the ABS and TCS appropriately.

In particular, in the case of a rolling bearing unit with a rotational speed detecting device of the present example, the rotation-detecting sensor 21b is supported by the metal core 30a, and the proximal end section of the seal member 44 is supported by the metal core 30a. Accordingly, such a cover 20 as is required in the conventional structure shown in FIGS. 5 and 6, is unnecessary, thus enabling miniaturization. Moreover, the portions on which the edges of the seal lips 45a, 45b and 45c provided on the seal member 44 make sliding contact with, and the portion that supports the encoder 29a, are separated in the supporting ring 36. That is, the encoder 29a is set on the outer peripheral surface of the outer diameter-side cylindrical portion 38, whereas the seal lip 45a of the inner end is on the inner diameter side of the outer diameter-side cylindrical portion 38. Accordingly, although the seal lip 45a and the encoder 29a are placed one on top of the other in the radial direction, the seal lip 45a and the encoder 29a do not interfere with each other. As a result, it is possible to ensure the width dimension of the portions with which the edges of the seal lips 45a, 45b and 45c make sliding contact, in contrast to the structure disclosed in the above-described Patent Reference 3. As a result, even in the case where the hub 4a is displaced with respect to the outer ring 1 due to the load applied during operation, it is possible to prevent the seal lips 45a, 45b and 45c from separating from the supporting ring 36, so that sufficient sealing performance can be ensured.

[Second Embodiment]

Figure 3:
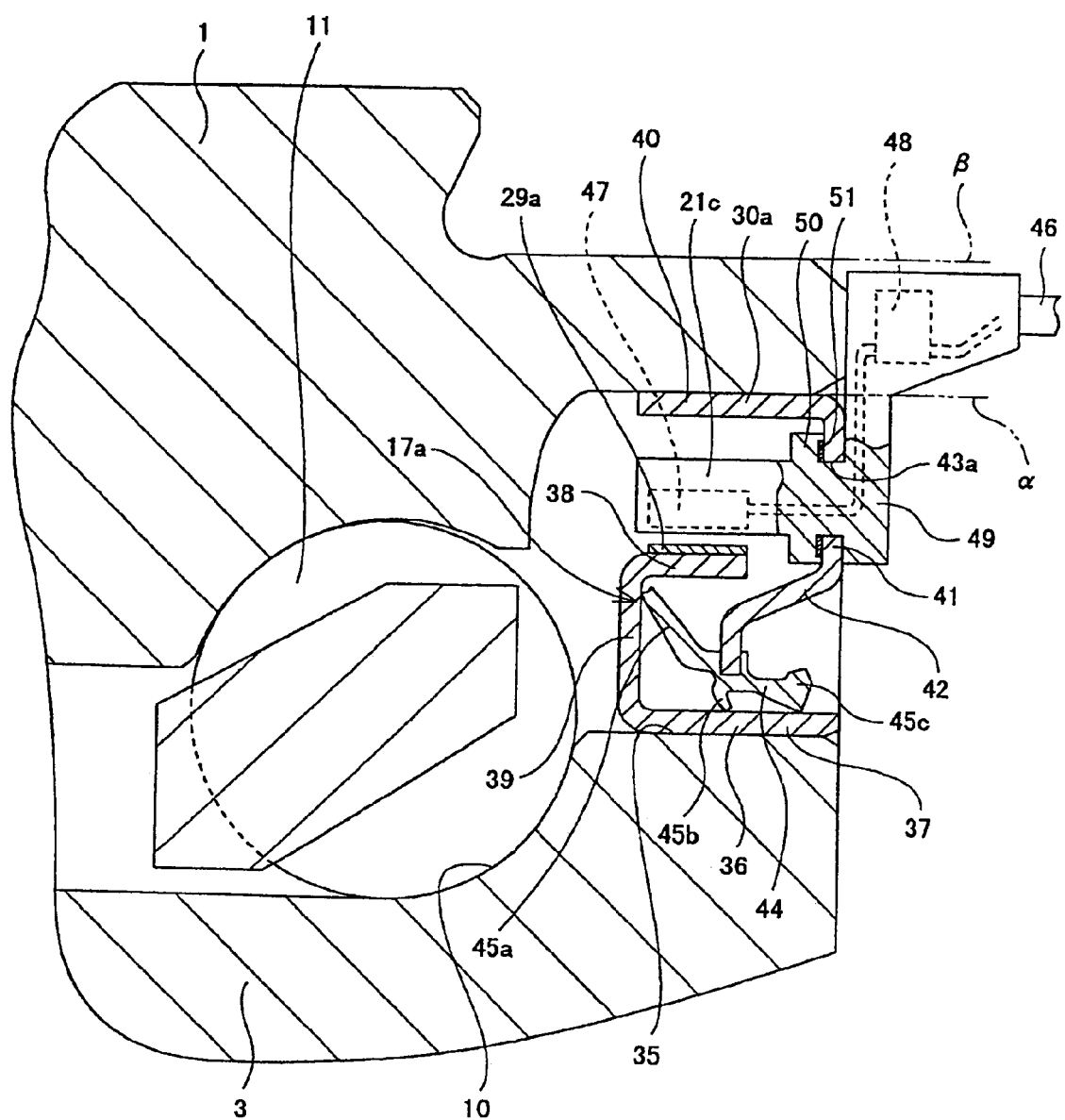
FIG. 3 shows a second embodiment of the present invention, which is similar to FIG. 2.

FIG. 3 shows a second embodiment according to a second aspect of the present invention. In the present example, similarly to the first embodiment described above, a combination seal ring 17a comprises a supporting ring 36, a metal core 30a, and a seal member 44. The supporting ring 36 corresponds to an inner diameter side seal ring element, and the combination of the metal core 30a and the seal member 44 corresponds to an outer diameter side seal ring element. An encoder 29a made of a permanent magnet is supported all around the circumference of the outer peripheral surface of an outer diameter-side cylindrical portion 38 constituting the supporting ring 36.

Especially in the present example, a rotation-detecting sensor 21c is formed by encapsulating and supporting an IC package 47 and a capacitor 48 mutually connected by a conducting wire, in a holder 49 made of a synthetic resin. The IC package 47 incorporates a magnetic detecting element such as a Hall element, a magnetoresistive element, or the like, whose characteristics change according to the direction of the magnetic flux, and a processing circuit for obtaining a signal corresponding to the change in the characteristics of the magnetic detecting element. It transmits a signal corresponding to the change in the characteristics of the part to be detected of the encoder 29a. The IC package 47 as described above is located on a portion further toward the space in which the rolling elements 11 are installed than the annular support portion 41, which constitutes the metal core 30a. Furthermore, the capacitor 48 is for removing high voltage noise and electromagnetic interference, contained in the signal output from the IC package 47, and has excellent high frequency properties. The capacitor 48 is located on a portion (a portion further inside than the inside end surface of the outer ring 1 in the example of the figure) farther from the space in which the rolling elements 11 are installed.

The holder 49 is injection molded by setting the IC package 47 and the capacitor 48 in a metallic mold cavity together with the metal core 30a, and then pouring a synthetic resin into the cavity in this state. The conducting wire for connecting the IC package 47 and the capacitor 48 is inserted in the support hole 43a formed in the outer diameter side half of the annular support portion 41 of the metal core 30a. Furthermore, at the time of injection molding, a packing 51 is sandwiched between a rim 50 formed on the outer peripheral surface of the holder 49, and one side surface of the metal core 30a, so that it prevents foreign substances such as muddy water and the like from entering the space in which the rolling elements 11 are installed, from the gap between the holder 49 and the support hole 43a. Since the IC package 47 (for example, Hall IC package) is thin and almost rectangular shaped with the length of the two sides of the detection surface both being several mm, and the height (thickness) approximately 1 mm, if the direction of the height is arranged facing in the radial direction of the metal core 30a, it is possible to arrange the IC package 47 between the pair of seal ring elements constituting the combination seal ring 17a. On the other hand, since the capacitor 48 is similar to a cubic shape with the length of each of its sides being several mm, there is no short (thin) side, so it is difficult to arrange it between the pair of seal ring elements. In the case of the present example, the IC package 47 and the capacitor 48 are arranged separately on opposite sides of the annular support portion 41, which enables efficient usage of the space, and thus it is possible to arrange a high performance rotation-detecting sensor 21c in the limited space.

Moreover, the inside half of the holder 49 extends in the radial direction, and the capacitor 48 is encapsulated in the part extending radially outward. A harness 46 for transmitting a detected signal from the rotation-detecting sensor 21c to a controller (not shown in the figure) is taken out from the extended part. That is, the end of the harness 46 is located between a virtual cylindrical surface α on the inner diameter side, which is an extension of the inner peripheral surface of the outer ring 1 inwardly in the axial direction, and a virtual cylindrical surface β on the outer diameter side, which is an extension of the outer peripheral surface of the outer ring 1 inwardly in the axial direction. In the case of the present example, by constructing in this manner, the end of the harness 46 is relatively located toward the outer diameter side, which prevents the harness 46 from rubbing against the parts that rotate with the hub, and thus prevents damage to the harness 46.

In the case of the present embodiment, it is preferable to use an acrylic rubber that has excellent heat resistance, as an elastomer for forming the seal member 44, which is fitted to the inner peripheral rim of the metal core 30*a*. This is to prevent the seal member 44 from deteriorating due to the heat when the holder 49 is injection molded in a state where the metal core 30*a* is set inside a mold, after the seal member 44 is fixed to the metal core 30*a* by baking. The construction and operation of the other parts are similar to those in the first embodiment.

[Third Embodiment]

Figure 4:
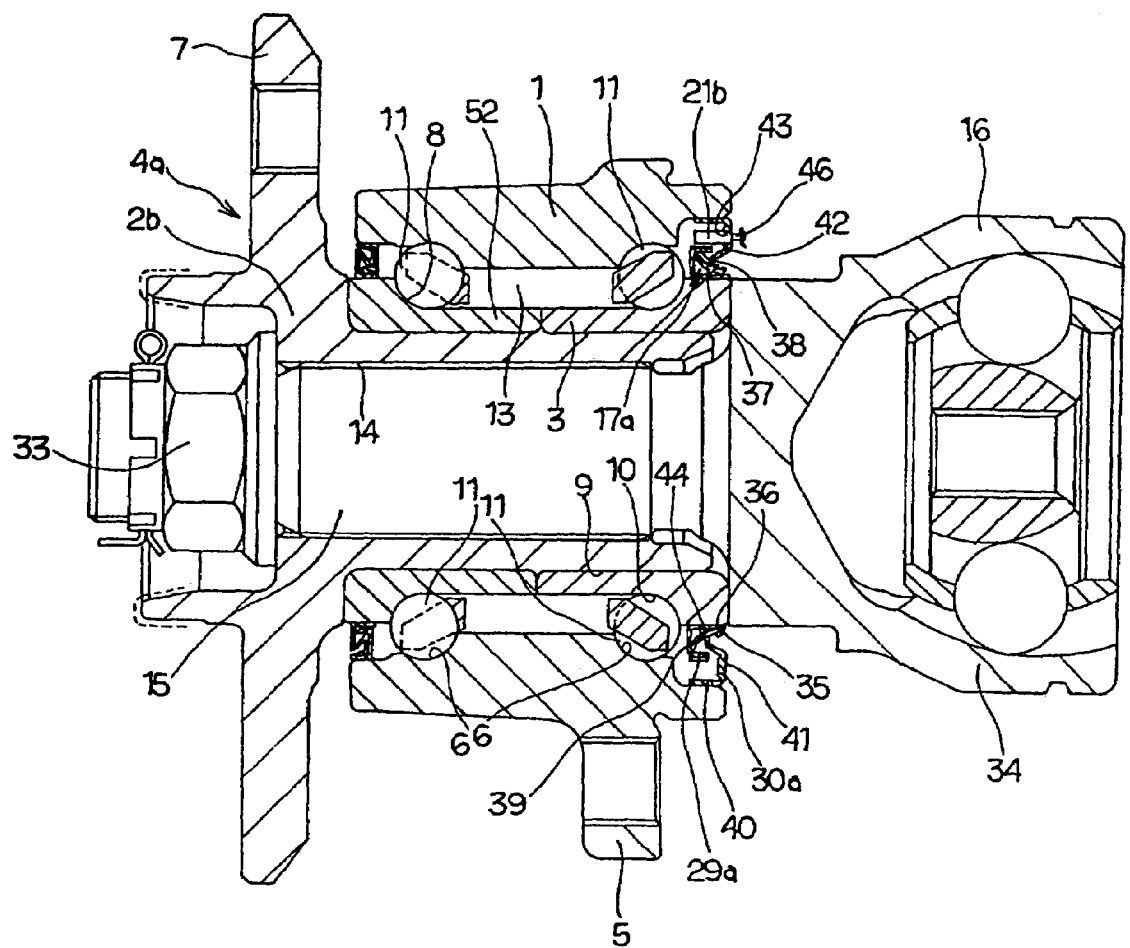
FIG. 4 is a cross-sectional diagram showing a third embodiment.

FIG. 4 shows a third embodiment according to the first aspect of the present invention. In the first embodiment described previously, the present invention is used for a so-called third generation rolling bearing unit (hub unit) wherein the first inner ring raceway 8 is formed directly on the outer peripheral surface of the middle portion of the hub body 2*a* (refer to FIG. 1). On the other hand, in the present example, the present invention is used for a so-called second generation rolling bearing unit wherein a first inner ring raceway 8 is formed on the outer peripheral surface of an inner ring 52 separate from a hub body 2*b*. When the rolling bearing unit is assembled, the inner ring 52 and the inner ring 3 are externally secured to the hub body 2*b*. The construction and operation of the other parts are similar to those in the first embodiment.

[Fourth Embodiment]

Figure 8:
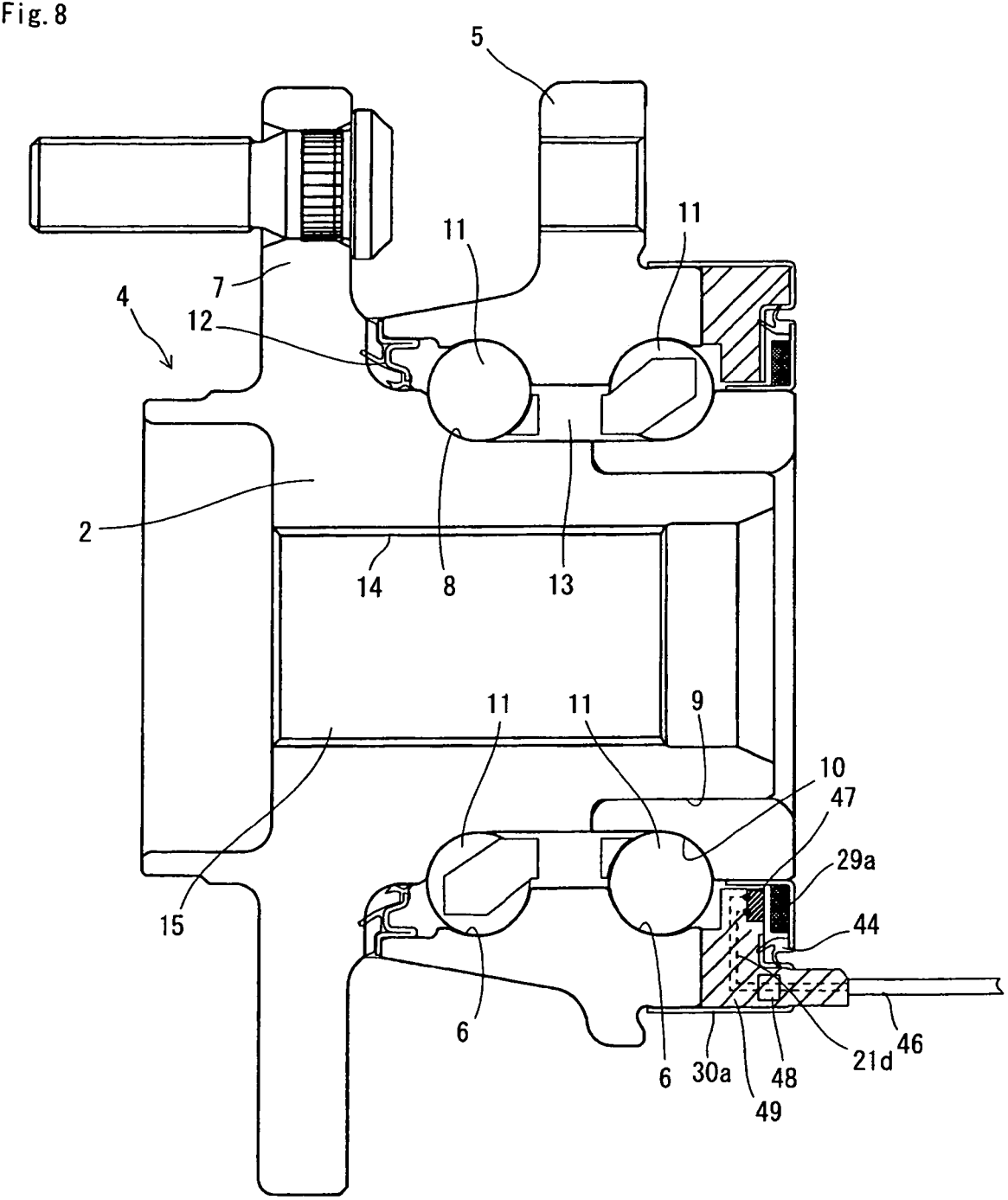
FIG. 8 is a diagram showing a fourth embodiment.

The present invention is not limited to the aforementioned embodiments, and it also covers, for example, a fourth embodiment shown in FIG. 8.

In the second embodiment described previously, an outer diameter side seal ring element 28 is fitted into an inner peripheral surface of the axially inside end of the outer ring 1. On the other hand, in the present example, an outer diameter side seal ring element 28 is fitted onto an outer peripheral surface of the axially inside end of the outer ring 1. Meanwhile, in the present example, similarly to the second embodiment described above, an IC package 47 is radially located on a portion of which distance from the rotating center axis of the bearing is smaller than the radius of the inner surface of the outer ring 1 at the inside end, and a capacitor 48 is radially located on a portion of which distance from the rotating center axis of the bearing is larger than the radius of the inner surface of the outer ring at the inside end. That is, the IC package 47 is located on the inner side of a virtual cylindrical surface which is an extension of the inner peripheral surface of the outer ring 1 inwardly in the axial direction, and the capacitor 48 is located on the outer side of the above virtual cylindrical surface.

In this example, of both axial side surfaces of the annular portion 39 of the supporting ring 36, an encoder 29*a* is fitted around the whole circumference of a surface which faces the internal space 13 in which the rolling elements are installed. Moreover, of an metal core 30*a* constituting the outer diameter side seal ring element 28, a portion further toward the inside end in the axial direction is bent inside in the radial direction, such that the metal core 30*a* covers the whole circumference of at least a part of the axially inside surface of an annular holder 49 made of synthetic resin, to support the holder 49 to the outer ring 1. A rotation-detecting sensor 21*d* is held by a part of the holder 49 in the circumferential direction, and it faces a surface to be detected of the encoder 29*a* from the internal space 13 side. Furthermore, the proximal end portion of a seal member 44 made of an elastic material, is fastened to a portion further toward the outer side than the encoder 29*a* in the radial direction of the annular portion 39. Seal lips 45 of the seal member 44 make a sliding contact all around a part of the core metal 30*a* which covers the whole circumference of the inside surface of the holder 49. Therefore, in this example, the combination of the supporting ring 36 and the seal member 44 corresponds to an inner diameter side seal ring element 18. However, this invention is not limited to the rolling bearing unit having the above structure of this embodiment. The construction and operation of the other parts are similar to those in the second embodiment.

INDUSTRIAL APPLICABILITY

The present invention provides a practical miniaturized rolling bearing unit with a rotational speed detecting device, which can obtain sufficient sealing performance, reliability, and durability.

The invention claimed is:

1. A rolling bearing unit with a rotational speed detecting device comprising:
    an outer ring which has double-row outer ring raceways on its inner peripheral surface, and does not rotate during use;
    a hub body which has a flange for supporting a wheel on a portion towards an outside end of its outer peripheral surface, and a first inner ring raceway, which faces the outer ring raceway axially outside of the double-row outer ring raceways, is provided on a middle portion either directly or via another member;
    an inner ring which has a second inner ring raceway, which faces the outer ring raceway axially inside of the double-row outer ring raceways, on an outer peripheral surface, and is externally secured to an inside end of the hub body;
    a plurality of rolling elements provided so as to be freely rotatable between the outer ring raceways, and each of the first and second inner ring raceways;
    a supporting ring, formed by bending a magnetic metal plate, which comprises an inner diameter-side cylindrical portion and an outer diameter-side cylindrical portion, which are concentric with each other, connected by a connecting portion, and is fixed to the inner ring by externally securing the inner diameter-side cylindrical portion to a portion at an outer peripheral surface of the inner ring which is away from the second inner ring raceway toward the inside;
    an encoder which is supported all around the circumference of an outer peripheral surface of the outer diameter-side cylindrical portion constituting the supporting ring, and the characteristics of an outer peripheral surface, which is a part to be detected, are changed alternately relative to the circumference direction;
    a metal core which is supported and fixed to an inside end of the outer ring;
    a rotation-detecting sensor in which a detecting portion thereof faces the outer peripheral surface of the encoder in the radial direction, in a state where it is supported by a portion of the metal core; and
    a seal member which is supported at a proximal end portion thereof by the metal core, and an edge portion thereof is made in a sliding contact all around the circumference of a part of the supporting ring or a part of the inner ring.

2. A rolling bearing unit with a rotational speed detecting device according to claim 1, wherein the seal member is located so as to seal the encoder.

3. A rolling bearing unit with a rotational speed detecting device comprising:

an outer ring which has double-row outer ring raceways on its inner peripheral surface, and does not rotate during use;

a hub body which has a flange for supporting a wheel on a portion towards an outside end of its outer peripheral surface, and a first inner ring raceway, which faces the outer ring raceway axially outside of the double-row outer ring raceways, is provided on a middle portion either directly or via another member;

an inner ring which has a second inner ring raceway, which faces the outer ring raceway axially inside of the double-row outer ring raceways, on an outer peripheral surface, and is externally secured to an inside end of the hub body;

a plurality of rolling elements provided so as to be freely rotatable between the outer ring raceways, and each of the first and second inner ring raceways;

a combination seal ring which is provided between a portion of the outer peripheral surface of the inside end of the inner ring, toward the inside, away from the second inner ring raceway, and the inner peripheral surface of the inside end of the outer ring, and which covers a ring shaped gap between the two surfaces, and comprises a pair of combined seal ring elements;

an encoder which is provided on a part of an inner diameter side seal ring element, being one of the two seal ring elements, fixed at the inside end of the inner ring, so that it is concentric to this inner ring, and the characteristics of the part to be detected are changed alternately relative to the circumference direction; and a rotation-detecting sensor which is provided on a part of the metal core constituting an outer diameter side seal ring element, among the two seal ring elements, fixed at the inside end of the outer ring, and its detecting section faces the part to be detected of the encoder, and the rotation-detecting sensor comprising; an IC package which is located on a portion further toward a space in which the rolling elements are installed than the outer diameter side seal ring element, for transmitting a signal corresponding to a change in the characteristics of the part to be detected of the encoder, and a capacitor which is located on a portion farther from the space in which the rolling elements are installed than the outer diameter side seal ring element, for processing a signal transmitted from the IC package.

4. A rolling bearing unit with a rotational speed detecting device comprising:

an outer ring which has double-row outer ring raceways on its inner peripheral surface, and does not rotate during use;

a hub body which has a flange for supporting a wheel on a portion towards an outside end of its outer peripheral surface, and a first inner ring raceway, which faces the outer ring raceway axially outside of the double-row outer ring raceways, is provided on a middle portion either directly or via another member;

an inner ring which has a second inner ring raceway, which faces the outer ring raceway axially inside of the double-row outer ring raceways, on an outer peripheral surface, and is externally secured to an inside end of the hub body;

a plurality of rolling elements provided so as to be freely rotatable between the outer ring raceways, and each of the first and second inner ring raceways;

a combination seal ring which prevents foreign substances such as muddy water from entering the space in which the rolling elements are installed from the inside end of the bearing, and comprises a pair of combined seal ring elements;

an encoder which is provided on a part of an inner diameter side seal ring element, being one of the two seal ring elements, fixed at the inside end of the inner ring, so that it is concentric to this inner ring, and the characteristics of the part to be detected are changed alternately relative to the circumference direction; and a rotation-detecting sensor which is provided on a part of the metal core constituting an outer diameter side seal ring element, among the two seal ring elements, fixed at the inside end of the outer ring, and its detecting section faces the part to be detected of the encoder, and the rotation-detecting sensor comprising; an IC package which is located on a portion of which distance from the rotating center axis of the bearing is smaller than the radius of the inner surface of the outer ring at the inside end, for transmitting a signal corresponding to a change in the characteristics of the part to be detected of the encoder, and a capacitor which is located on a portion of which distance from the rotating center axis of the bearing is larger than the radius of the inner surface of the outer ring at the inside end, for processing a signal transmitted from the IC package.

5. A rolling bearing unit with a rotational speed detecting device according to claim 1, wherein the encoder is made of a permanent magnet, in which the direction of polarization is changed alternately around the direction of the circumference at equal spacing, so that south poles and north poles of the surface to be detected are positioned alternately and at equal spacing, and the rotation-detecting sensor is an active type magnetic sensor in which a magnetic detecting element is installed whose characteristics change according to the direction of the magnetic flux.

* * * * *